(12) United States Patent
Bart et al.

(10) Patent No.: US 11,907,045 B2
(45) Date of Patent: Feb. 20, 2024

(54) INFORMATION EXTRACTION FROM MAINTENANCE LOGS

(71) Applicant: Novity, Inc., San Carlos, CA (US)

(72) Inventors: Evgeniy Bart, Santa Clara, CA (US); Kai Frank Goebel, Mountain View, CA (US)

(73) Assignee: Novity, Inc., San Carlos, CA (US)

( * ) Notice: Subject to any disclaimer, the term of this patent is extended or adjusted under 35 U.S.C. 154(b) by 114 days.

(21) Appl. No.: 17/729,976

(22) Filed: Apr. 26, 2022

(65) Prior Publication Data
US 2023/0342232 A1  Oct. 26, 2023

(51) Int. Cl.
*G06F 11/00* (2006.01)
*G06N 20/00* (2019.01)

(52) U.S. Cl.
CPC .......... *G06F 11/008* (2013.01); *G06N 20/00* (2019.01)

(58) Field of Classification Search
CPC .............................. G06F 11/008; G06N 20/00
USPC ....................................................... 714/1–57
See application file for complete search history.

(56) References Cited

U.S. PATENT DOCUMENTS

| | | | |
|---|---|---|---|
| 2009/0259670 A1* | 10/2009 | Inmon | G06F 40/151 |
| 2018/0114142 A1* | 4/2018 | Mueller | G06N 20/10 |
| 2020/0251106 A1* | 8/2020 | Benkreira | G10L 15/22 |
| 2020/0302540 A1* | 9/2020 | Xiu | G06F 40/30 |
| 2021/0089325 A1* | 3/2021 | Suryanarayana | G06F 9/455 |
| 2022/0343217 A1* | 10/2022 | Mohandoss | G06F 40/40 |
| 2023/0267273 A1* | 8/2023 | Theriappan | G06N 20/00 704/9 |

* cited by examiner

*Primary Examiner* — Sarai E Butler
(74) *Attorney, Agent, or Firm* — Shun Yao; Yao Legal Services, Inc.

(57) ABSTRACT

One embodiment provides a system for processing natural-language entries. The system obtains a plurality of historical natural-language entries associated with a first domain and pre-processes the historical natural-language entries to obtain a set of generic terms and a set of domain-specific terms. The system trains a machine learning model in the first domain using the plurality of historical natural-language entries associated with the first domain. The training comprises learning weight values of one or more generic terms, a weight value of a respective generic term indicating likelihood that the generic term is related to a trigger event. The system generalizes the machine learning model trained in the first domain, thereby allowing the model to be applied to a second domain. The system processes a natural-language entry associated with the second domain using the generalized machine learning model to determine whether the natural-language entry associated with the second domain corresponds to the trigger event.

20 Claims, 7 Drawing Sheets

INFORMATION EXTRACTION FROM MAINTENANCE LOGS

BACKGROUND

Field

This disclosure is generally related to language processing. More specifically, this disclosure is related to extracting useful information from maintenance logs to facilitate accurate prediction of the remaining useful life (RUL) of equipment or machinery.

Related Art

Detection and diagnosis of faults in mechanical and electrical equipment can be very important in many industries. Correct prediction of a total useful life (TUL) or remaining useful life (RUL) of such equipment can have great fiscal impact. Various techniques (e.g., health-management or RUL-prediction algorithms) have been developed to report on the current and future state of health of assets so that timely maintenance can be performed to prevent failures and to extend the RUL of these assets.

Certain maintenance actions (e.g., repair or replacement of faulty components) may result in significant changes to operational signatures of the RUL-prediction algorithms. To continue providing accurate RUL predictions, the algorithms need to be reset or recalibrated to account for these changes.

SUMMARY

One embodiment provides a method and a system for processing natural-language entries. During operation, the system obtains a plurality of historical natural-language entries associated with a first domain and pre-processes the historical natural-language entries to obtain a set of generic terms and a set of domain-specific terms. The system trains a machine-learning model in the first domain using the plurality of historical natural-language entries associated with the first domain. The training comprises learning weight values of at least one or more generic terms, a weight value of a respective generic term indicating the likelihood that the respective generic term is related to a trigger event. The system generalizes the machine learning model trained in the first domain, thereby allowing the machine learning model to be applied to a second domain. The system processes a natural-language entry associated with the second domain using the generalized machine learning model to determine whether the natural-language entry associated with the second domain corresponds to the trigger event.

In a variation on this embodiment, generalizing the machine learning model can further include determining weight values of generic terms included in natural-language entries associated with the second domain based on weight values of corresponding generic terms learned from training the machine learning model in the first domain.

In a further variation, training the machine learning model in the first domain can further include learning weight values of one or more domain-specific terms, and generalizing the machine learning model can include determining a weight value of a term specific to the second domain based on a weight value of an analogous term specific to the first domain learned from training the machine learning model in the first domain.

In a further variation, determining the weight values of generic terms included in natural-language entries associated with the second domain can include one of: assigning a weight value to a generic term in the second domain as the learned weight value of a corresponding generic term in the first domain and assigning a discrete weight value to a generic term in the second domain based on a polarity of the learned weight value of a corresponding generic term in the first domain.

In a further variation, generalizing the machine learning model can further include adjusting the weight values of generic terms in the second domain by performing partial training of the machine learning model using a limited number of historical natural-language entries associated with the second domain.

In a variation on this embodiment, the machine learning model can include a linear support vector machine (SVM) model, a naïve Bayesian model, a neural network, or other model representations.

In a variation on this embodiment, the natural-language entries are maintenance-log entries associated with a device. In response to determining that a maintenance-log entry associated with the second domain corresponds to a trigger event that alters an operational signature of the device, the system can recalibrate a prognosis operation that predicts a remaining useful life (RUL) of the device.

BRIEF DESCRIPTION OF THE FIGURES

In the figures, like reference numerals refer to the same figure elements.

DETAILED DESCRIPTION

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

Embodiments described herein provide a system and method for extracting useful information from maintenance logs of assets for purposes of facilitating the resetting or recalibration of an asset-health-management system that manages the health of the assets, such as predicting the remaining useful life (RUL) of the assets. More specifically, a machine learning model can be trained to process real-life maintenance logs to determine whether a maintenance action triggering resetting or recalibration of the asset-health-management system has been performed. The machine learning model can be trained using a corpus containing maintenance logs of a particular asset. During training, terms in the corpus can be grouped into a generic group and an asset-specific group. The machine learning model can learn the weights of terms in each group separately; the weight of a term indicating the likelihood that the maintenance action corresponding to the term will significantly affect the operational signature of the asset. Because certain assets may lack training data, to process the maintenance logs of such an asset, one may train the machine learning model using the corpus of a different asset and then apply the trained model to the asset lacking training data. In one embodiment, weights of generic terms learned from maintenance logs of an old asset can be used to derive the weights of the same generic terms in maintenance logs of a new asset. In one embodiment, weights of asset-specific terms learned from maintenance logs of an old asset can be used to infer the weights of analogous asset-specific terms in maintenance logs of a new asset. By generalizing a machine learning model trained in one domain to an additional domain, the disclosed embodiments solve the problem of lacking training data in certain domains.

Asset-Health-Management Based on Maintenance Logs

A typical asset-health-management system can predict the remaining useful life (RUL) of a managed asset by modeling the behavior of the asset and by collecting and analyzing sensor data during usage. The sensor data reflects the current operational condition of the asset and can be referred to as the operational signature. The RUL prediction depends on the operational signature of the asset. A scheduled or on-demand maintenance action may significantly change the operational signature of the asset, thus requiring the resetting/recalibration of the asset-health-management system. It is important that the asset-health-management system takes into consideration the maintenance actions (especially the ones altering the operational signature of the asset) in order to continue predicting the RUL of the asset accurately.

Figure 1:
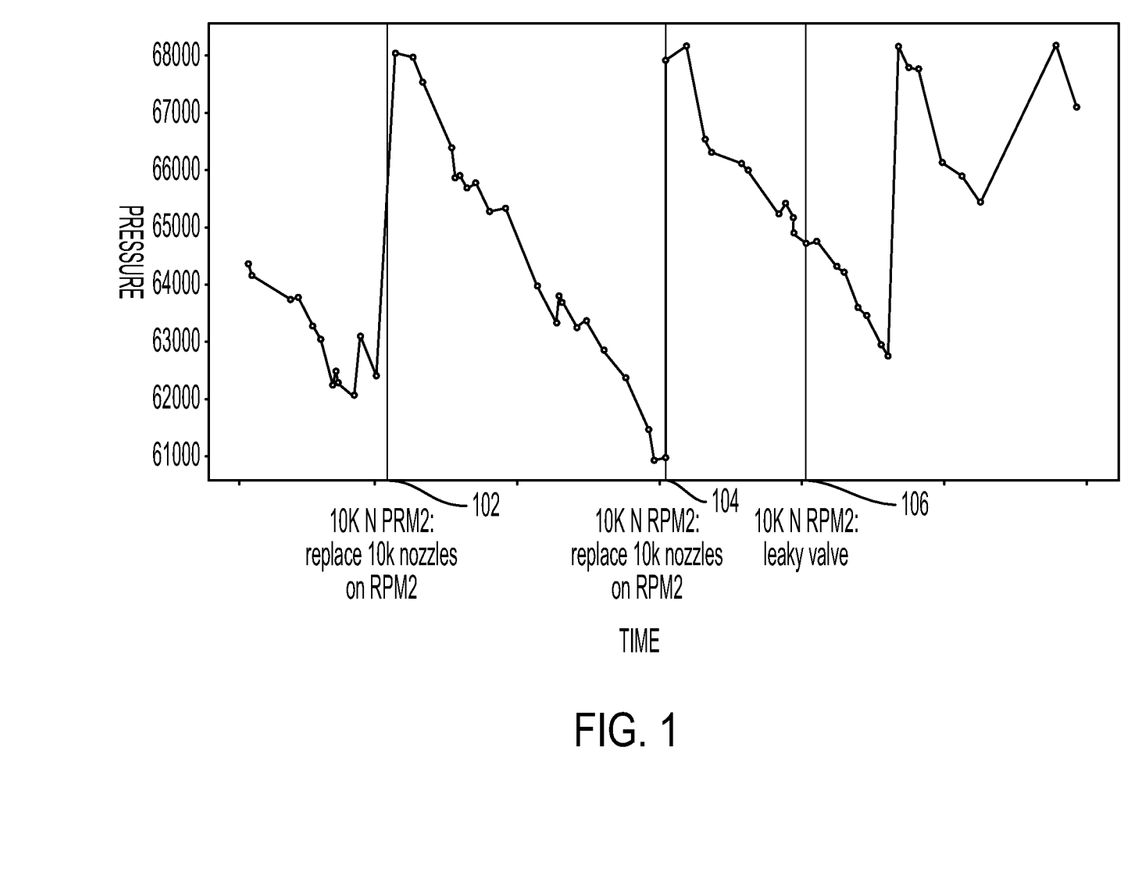
FIG. 1 illustrates an exemplary output of a pressure sensor at a nozzle as a function of time.

Using a nozzle as an example, in general, due to the gradual erosion of material at the orifice of the nozzle, the liquid pressure measured by a sensor at the nozzle decreases continuously over time. However, certain maintenance actions can cause sudden changes in the measured pressure. For example, when a clogged nozzle is replaced, the pressure measured at the nozzle can have a sudden increase or jump. FIG. 1 illustrates an exemplary output of a pressure sensor at a nozzle as a function of time. The vertical axis is the pressure with a normalized unit. The horizontal axis is the time axis. As shown in FIG. 1, as time passes, a number of maintenance actions have been performed, including a first replace-nozzle action performed at a time instant 102, a second replace-nozzle action performed at a time instant 104, and a fix-leaky-valve action performed at a time instant 106.

FIG. 1 also shows that certain maintenance actions cause discontinuity or sudden changes of the nozzle pressure, whereas other maintenance actions may not cause such change. For example, the replace-nozzle actions at time instants 102 and 104 have caused the nozzle pressure to increase sharply, whereas the fix-leaky-valve action at time instant 106 has little or no effect on the nozzle pressure. Because the pressure is part of the operational signature of the nozzle, the sudden change in pressure leads to a sudden change of the operational signature, which then requires the resetting/recalibrating of the asset-health-management system.

To enable the asset-health-management system to make accurate predictions of the RUL of the asset, the asset-health-management system needs to know whether one or more maintenance actions affecting the operational signature has been performed. One approach is to manually reset the asset-health-management system each time such a maintenance operation is performed. However, maintenance operations are typically performed by maintenance crew members who may not have access to the asset-health-management system. Moreover, an organization may need to manage a larger number (thousands or more) of assets, and manually synchronizing all maintenance efforts with respective health assessment algorithms on all assets can be challenging. It is desirable to have an automated mechanism to provide feedback of maintenance actions to the asset-health-management system.

The maintenance logs of assets can include information about the status of the assets and how that status changes over time. Mining that information has the potential to assist with a wide variety of tasks, including RUL prediction. In some embodiments, the asset-health-management system can mine maintenance logs to identify reportable events (e.g., a maintenance operation affecting the operational signature of an asset) recorded in the logs in order to calibrate/reset its RUL-prediction algorithms when needed. Machine learning and natural language processing (NLP) techniques can be used to interpret the natural language information included in the maintenance logs. However, unlike other NLP tasks, analyzing maintenance logs involve many challenges due to peculiarities of the domain. First, a typical log entry can include brief, terse, grammatically incomplete sentences with a lot of jargon and abbreviations. For example, a maintenance log may include entries like "replace nozzle," "repair leak," "check oil level," "gasket replacement," "fan," "stuck FV-004-HMRPM4," etc. Conventional NLP techniques may not be able to extract useful information from these log entries. Second, machine learning and NLP require a large amount of training data in order to build an accurate model. The training data can include logs of previous maintenance actions. However, certain types of assets or devices (e.g., bearings) are maintained infrequently (once a year or sometimes once a decade), leading to a scarcity of training data in those domains.

For example, even within the same factory or plant, some devices (e.g., nozzles) may have maintenance performed on them multiple times a year, and there can be multiple similar devices, resulting in many maintenance records; and some devices (e.g., bearings) may only be serviced once in multiple years or decades, resulting in virtually no relevant maintenance records. In other words, there are ample training data in the nozzle domain but little or no training data in the bearing domain. Therefore, although developing a machine learning model to process maintenance logs in the nozzle domain can be a relatively more straightforward task, developing a machine learning model that can process maintenance logs in the bearing domain can be challenging.

The instant application provides a system and method that facilitates the development and training of machine learning models that can effectively process maintenance logs of assets in domains with scarce training data. More specifically, a machine learning model trained in one domain with ample training data can be generalized and applied to another domain with scarce training data. To be able to generalize the model across domains, when training the model, the terms in the training corpus can be separated into two groups, a group containing generic terms and a group containing asset-specific terms. Generic terms are general terms used in maintenance settings such as "replace," "fix," "repair," "bad," etc. They can often be found in maintenance logs from many different domains. On the other hand, asset-specific (also referred to as domain-specific) terms are terms related to the type of asset being serviced. For example, terms like "nozzle, "pipe," "line," etc. may only be found in maintenance logs from the nozzle domain. The machine learning model can be trained to learn the weights of the generic terms and the domain-specific terms separately. The learned weights of the generic terms can then be generalized to a different domain (e.g., a domain lacking training data) to allow the machine learning model to make predictions regarding whether a maintenance action alters the operational signature of the asset in that domain.

The weight of each term indicates the likelihood that the term is associated with a maintenance action that significantly changes the operational signature of the asset. Learning the weights of the terms can start with collecting and labeling the training data. The training data can include historical maintenance records. In some embodiments, the training data can be manually labeled where a human operator (e.g., a domain expert) may compare the maintenance records of the asset with the corresponding sensor data (e.g., data recorded within the same time frame as the maintenance records) and manually label a maintenance record as a trigger event if the sensor data indicates that the operational signature of the asset changes significantly right after the maintenance action. Using FIG. 1 as an example, by comparing the maintenance record and the recorded output of the pressure sensor, the operator may manually label the maintenance records "10K N RPM2: replace 10 k nozzles on RPM2" at time instants 102 and 104 as trigger events; the operator may also label the maintenance record "10K N RPM2: leaky valve" at time instant 106 as a non-trigger event. Alternatively, the training data can be labeled automatically. For example, the sensor data can be processed to identify discontinuous points (e.g., a sudden increase or decrease), and maintenance records corresponding to those identified discontinuous points can be automatically labeled as trigger events. In some embodiments, if the change in the sensor data exceeds a threshold (e.g., 40%) within a time window of a predetermined size (e.g., a few hours), the maintenance records corresponding to the time instant when the change occurs can be labeled automatically as a trigger event.

Figure 2:
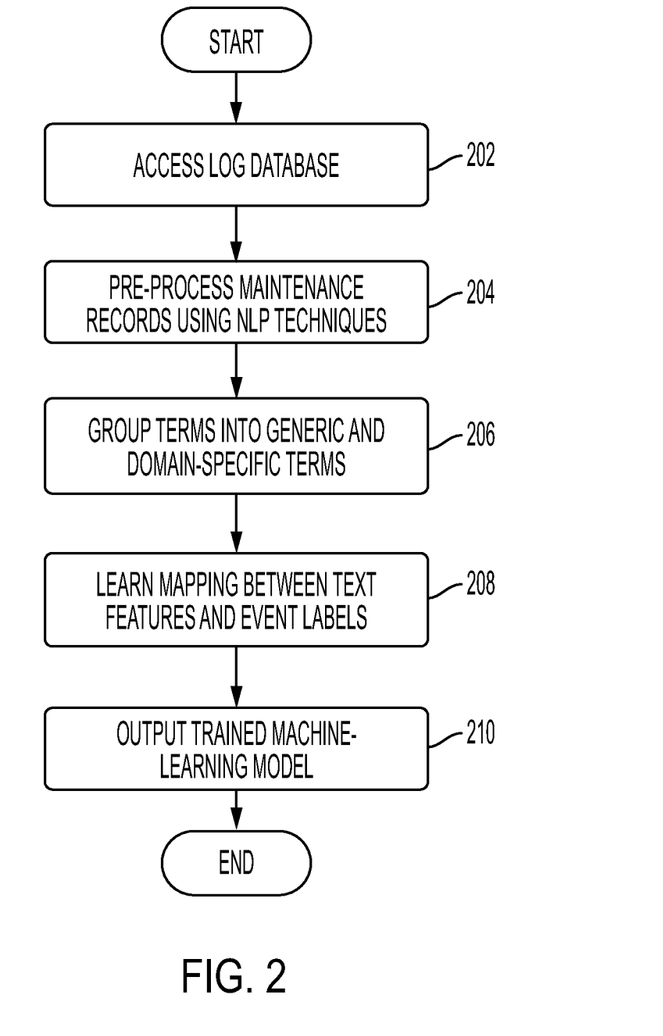
FIG. 2 presents a flowchart illustrating an exemplary process for training a machine learning model, according to one embodiment.

FIG. 2 presents a flowchart illustrating an exemplary process for training a machine learning model, according to one embodiment. During operation, the training system accesses a log database containing maintenance logs for one particular type of device (operation 202). For example, the log database of a nozzle can include records of past maintenance actions performed on the nozzle. The training system can pre-process the maintenance records using standard NLP techniques to extract text features from the maintenance logs (operation 204). For example, the training system can split the language describing the maintenance actions into tokens. In some embodiments, when splitting the textual description into tokens, the training system can perform various NLP operations, such as lemmatization, stemming, and filtering out the stopping words. In one embodiment, filtering out stopping words can be performed based on domain knowledge. More specifically, the training system can use the diagram of the plant (or factory) to determine which components cannot possibly affect each other and add names of those components to the stopping word list.

The training system can also group the terms into a generic group and a domain-specific group (operation 206). In some embodiments, a previously trained model (e.g., a classifier) can be used to automatically classify a term in the maintenance logs as a generic term or a domain-specific term. Once a term is determined as a generic term, it can be added to a generic term database.

Subsequently, the training system can learn a mapping between the text features (e.g., terms) and event labels (e.g., trigger to non-trigger events) (operation 208). In some embodiments, the training system can learn the weights of one or more terms, with the weight of a term indicating the likelihood that the term is associated with a trigger event (e.g., the term is included in a maintenance-log entry describing a maintenance action that significantly changes the operational signature of the asset). Various machine learning techniques can be used to train the machine learning model, including but not limited to: linear support vector machine (SVM), naïve Bayes classifiers, training a neural network, etc. The training system then outputs the trained machine learning model (operation 210).

The trained machine learning model can then be used to detect trigger events based on maintenance-log entries. For example, when a new maintenance-log entry is used as input to the model, the model can make predictions regarding whether the log entry is associated with a trigger event (i.e., whether the corresponding maintenance action has altered the operational signature of the asset). If a trigger event is detected, the asset-health-management system can reset or recalibrate in order to make accurate predictions of the RUL of the asset. In the example shown in FIG. 2, the training is performed using historical maintenance logs and corresponding sensor data associated with a particular type of asset or equipment. In other words, the machine learning model is trained in a particular domain. Naturally, the trained model can be used to process maintenance-log entries in the same domain. For example, a model trained using historical maintenance logs within the nozzle domain can be used to process new maintenance-log entries in the nozzle domain.

Figure 3:
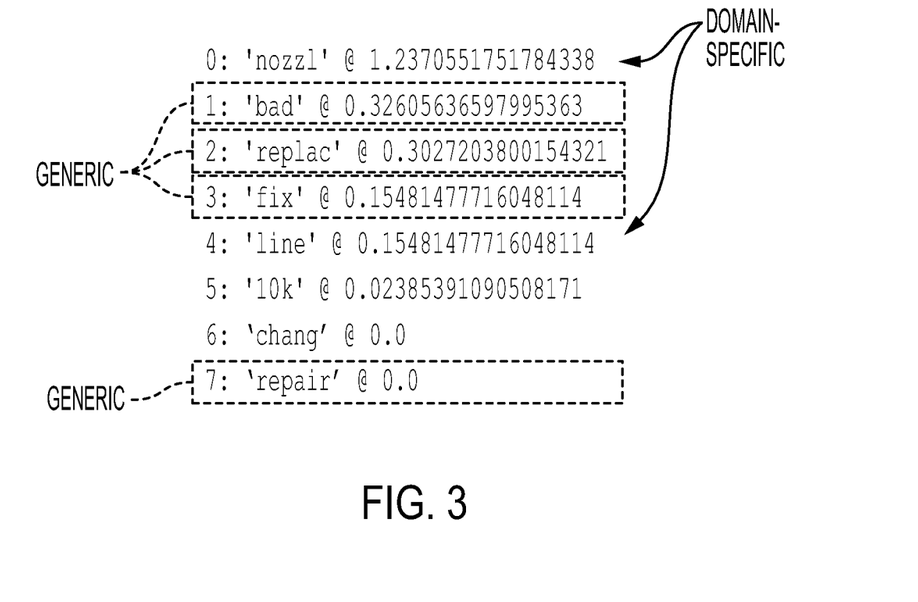
FIG. 3 shows exemplary training results, according to one embodiment.

FIG. 3 shows exemplary training results, according to one embodiment. More specifically, FIG. 3 shows the learned weights of a number of text features. Note that the weight of a term indicates the likelihood that the text feature (or term) is associated with a trigger event (e.g., an entry containing the term is describing a maintenance action that alters the operational signature of the asset). The higher the weight, the more likely the term is associated with a trigger event. FIG. 3 also shows that one set of features (i.e., features 1, 2, 3, and 7) are recognized as generic features, and another set of features (i.e., features 0 and 4) are recognized as domain-specific features. A number of features are undetermined. As discussed previously, the generic terms will also appear in maintenance logs of a different domain, such as a domain having insufficient training data. In some embodiments, the weights of the generic terms learned in one domain can be generalized to a different domain. In further embodiments, it is also possible to generalize the weights of the domain-specific terms across domains. Note that in the example shown in FIG. 3, the weights of the different text features are independent of each other. In practice, when different machine learning models are used (e.g., other than the linear SVM or naïve Bayes), the weights of the different text features may depend on each other.

There are a variety of ways to generalize the weights of the generic terms across domains. In some embodiments, the weights can be directly applied across domains, i.e., the weight of a generic term learned from one domain can be applied to the same generic term in a different domain. In alternative embodiments, the generalization may be less direct. For example, the weights can be discretized such that a generic term having a positive weight in a first domain (i.e., the domain it is trained on) will be assigned a weight of "+1" in a second domain (i.e., the domain with little or no training data), a generic term having a negative weight in the first domain will be assigned a weight of "−1" in the second domain; and a generic term having a weight of 0 or close to 0 will be assigned a weight 0 in the second domain. This way, the "polarity" of the term is preserved, but the magnitude of the weight is abstracted away. Alternatively, bigrams (a pair of consecutive words) can be used where the model learns the weight of a bigram containing a generic word and a domain-specific word and generalizes the learned weight to a bigram containing the same generic word in a new domain. For example, the model can learn the weight of a bigram "replace nozzle" in the nozzle domain and then generalize the learned weight to a bigram "replace gasket" in the gasket domain. Other means to generalize the weights of the generic terms are also possible, as long as the weights learned in one domain can be used as the base knowledge for determining weights of the same or similar terms in another domain. The scope of this disclosure is not limited to the actual implementation of the generalization mechanisms.

When generalizing the model across domains, the domain-specific text features (e.g., features 0 and 4 in FIG. 3) are treated differently than the generic features. In some embodiments, the domain-specific features can be ignored. In some embodiments, the system may identify features in a new domain that are analogous to features in the old domain (also referred to as the training domain) and then generalize weights learned from the old domain to the new domain (also referred to as the extended domain). For example, based on the occurrence patterns of the bigrams "replace nozzle" and "replace gasket" in the nozzle and gasket domains, respectively, the system may determine that the terms "nozzle" and "gasket" are analogous terms. The nozzle domain contains plenty of training data to allow the model to learn the weight of the term "nozzle." On the other hand, the gasket domain lacks training data. However, once the system determines that "gasket" and "nozzle" are similar terms, the weight of the term "nozzle" learned from the nozzle domain can be generalized to the term "gasket" in the gasket domain. When generalizing the model for the domain-specific terms, similar techniques (e.g., directly applying or discretizing the weights) can be used.

Figure 4:
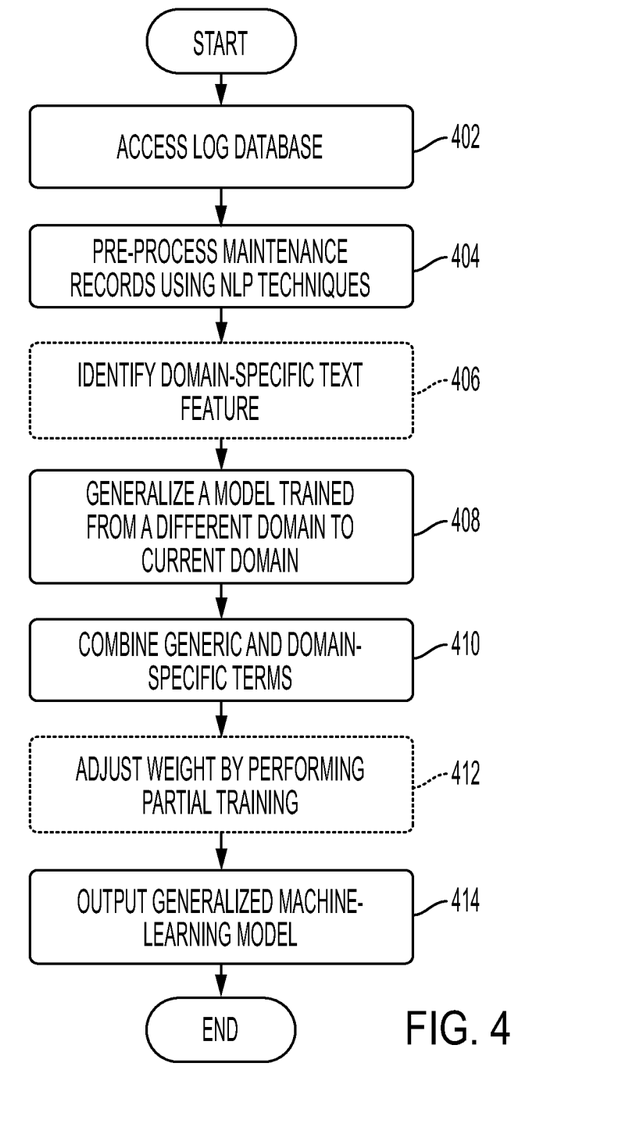
FIG. 4 presents a flowchart illustrating an exemplary process for generalizing/extending a machine learning model across domains, according to one embodiment.

FIG. 4 presents a flowchart illustrating an exemplary process for generalizing/extending a machine learning model across domains, according to one embodiment. During operation, the training system accesses a log database containing maintenance logs for a type of device that is less frequently serviced (operation 402). The maintenance logs may have only a few entries due to the lack of historical data. In some situations, there are log entries regarding the maintenance actions, but there is no sensor data to indicate whether certain maintenance actions have altered the operational signature of the asset.

The training system can pre-process the maintenance records using standard NLP techniques to extract text features from the maintenance logs (operation 404). Operation 404 can be similar to operation 204 and can include processes like lemmatization, stemming, and filtering out the stopping words.

The training system can optionally identify domain-specific text features included in the maintenance logs (operation 406). This operation is optional because it is also possible to ignore the domain-specific text features (or terms).

The training system can then generalize a model trained in a different domain (i.e., the training domain) to the current domain (i.e., the extended domain) (operation 408). Generalizing the model can include generalizing knowledge learned from the training domain to the current extended domain. For example, the generalized model can determine the initial weight values of the generic terms based on the weights of these generic terms learned from the training domain. In some embodiments, determining the initial weight value of a generic term can include directly copying the weight value of the generic term learned from the training domain. In some embodiments, determining the initial weight value of a generic term can include assigning a discrete weight value to the generic term based on the polarity (positive, negative, or zero) of the weight value of the generic term learned from the training domain. In certain scenarios (e.g., when analogous domain-specific terms are detected), the generalized model can also determine the initial weight values of the detected analogous domain-specific terms based on the weights of the corresponding domain-specific terms learned from the training domain. The initial weight value of these analogous domain-specific terms can be determined using a technique similar to the one used for the generic terms.

The training system can combine the generic and domain-specific terms with initial weight values (operation 410) and optionally adjust the weights of these terms by performing partial training using available training data (operation 412). Because the current domain does not have sufficient training data for training the model, this training operation is supplementary. In situations where no training data is available in the current domain, operation 412 is skipped and the initial weight values of the terms, including the generic and domain-specific terms, will be the learned weights of the model. The training system can then output the generalized model (operation 414).

Figure 5:
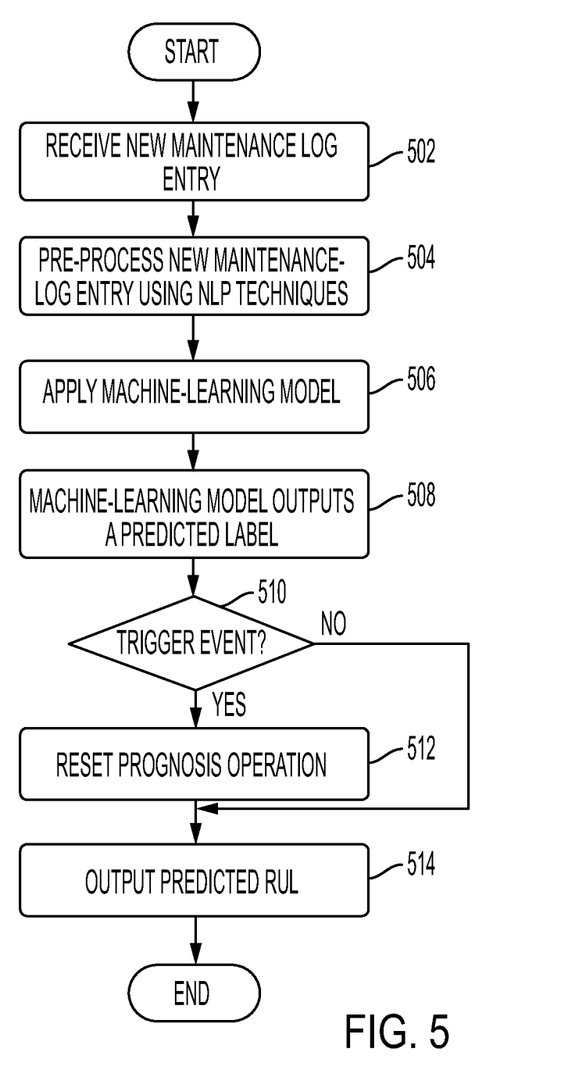
FIG. 5 presents a flowchart illustrating an exemplary process for applying the machine learning model to detect trigger events, according to one embodiment.

FIG. 5 presents a flowchart illustrating an exemplary process for applying the machine learning model to detect trigger events, according to one embodiment. The process can be performed by the asset-health-management system when it is managing the health of a particular type of asset that is less frequently serviced. During operation, the asset-health-management system receives a new maintenance-log entry describing a maintenance action recently performed on the asset (operation 502). The asset-health-management system can pre-process the maintenance-log entry using standard NLP techniques to extract text features from the maintenance logs (operation 504). Operation 504 can be similar to operation 204 or 404 and can include processes like lemmatization, stemming, and filtering out the stopping words.

The asset-health-management system can then apply a machine learning model (e.g., a classifier) that is trained using training data from a different domain and generalized to the current domain (operation 506). In some embodiments, the text features obtained from pre-processing the new maintenance-log entry is used as input to the machine learning model, which can be a linear classifier. The processes for training and generalization of the machine learning model can be similar to the ones shown in FIG. 2 and FIG. 4. The machine learning model outputs a predicted label for the maintenance-log entry (operation 508). Based on the predicted label, the asset-health-management system determines whether the maintenance action is a trigger event (operation 510), i.e., whether the maintenance action alters the operational signature of the asset. If so, the asset-health-management system resets or recalibrates its prognosis operation (operation 512). Otherwise, the asset-health-management system outputs its RUL prediction without resetting (operation 514).

Figure 6:
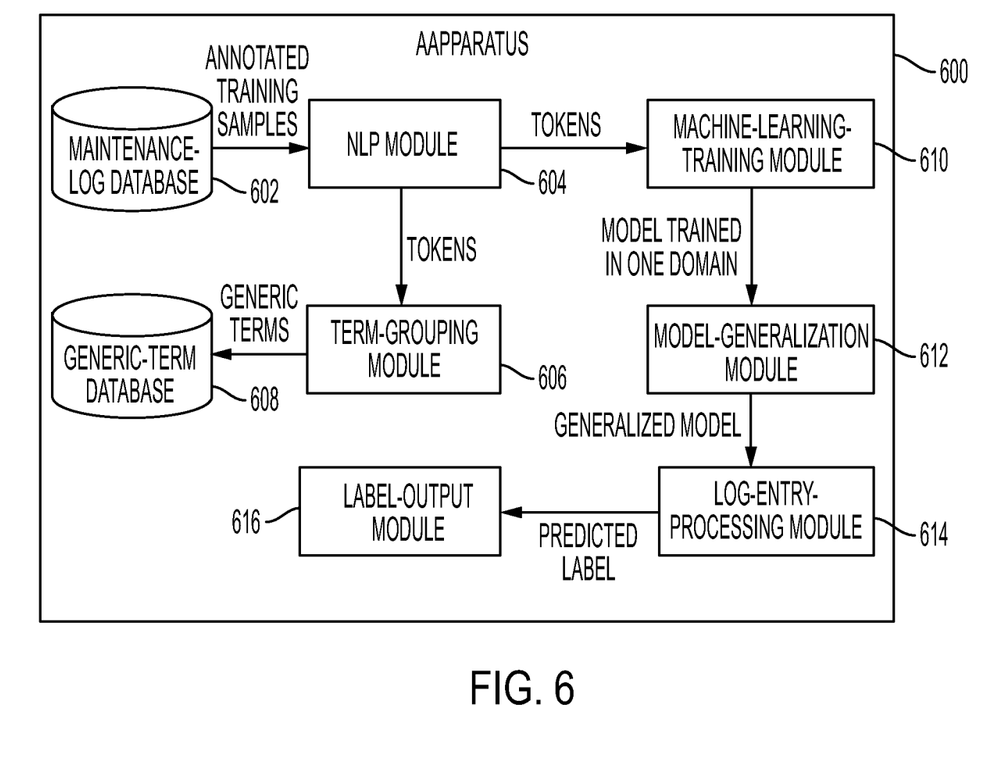
FIG. 6 illustrates a block diagram of an exemplary apparatus for processing maintenance-log entries, according to one embodiment.

FIG. 6 illustrates a block diagram of an exemplary apparatus for processing maintenance-log entries, according to one embodiment. Apparatus 600 includes a maintenance-log database 602, an NLP module 604, a term-grouping module 606, a generic-term database 608, a machine learning-training module 610, a model-generalization module 612, a log-entry-processing module 614, and a label-output module 616.

Maintenance-log database 602 contains annotated historical maintenance-log entries. Such data may only be available for certain domains (i.e., devices that are frequently serviced). NLP module 604 can be responsible for pre-processing the maintenance-log entries, which can include operations like lemmatization, stemming, and filtering out the stopping words. Term-grouping module 606 can group the terms (or tokens) in the maintenance logs into a generic group containing generic terms and a domain-specific group containing domain-specific terms. Generic-term database 608 can store identified generic terms.

Machine learning-training module 610 can train a machine learning model (e.g., a linear classifier) using the annotated training samples from a particular domain. Examples of the machine learning model can include linear SVM models, naïve Bayesian models, neural networks, or other model representations. In some embodiments, the model learns the weights (which indicate the likelihood that the corresponding terms are associated with trigger events). The model can learn the weights for both the generic terms and the domain-specific terms. Model-generalization module 612 can generalize the model trained in one particular domain to a different domain (e.g., a domain that lacks the training data). In some embodiments, generalizing the model can involve generalizing the weights of the generic terms learned from one domain to another domain. Generalizing the weights of the generic terms can include directly copying the weight values from the old domain to the new domain or assigning discrete weight values in the new domain based on the polarity of the weight values in the old domain. Generalizing the model can also involve generalizing the weights of the certain domain-specific terms learned from the old domain to analogous domain-specific terms in the new domain. In further embodiments, generalizing the model can further include adjusting the generalized weights by performing partial training based on training data (if available) of the new domain.

During runtime, log-entry-processing module 614 can process a newly received maintenance-log entry describing a maintenance action performed on the asset in the new domain by executing the generalized model (i.e., using the newly received log entry as model input). More specifically, log-entry-processing module 614 can generate a predicted label for the log entry. The label can indicate whether the log entry is associated with a trigger event. In some embodiments, log-entry-processing module 614 can predict the label for the log entry based on one or more terms included in the log entry. For example, if at least one term included in the log entry has a predicted weight value exceeding a predetermined threshold, log-entry-processing module 614 can label the log entry as being associated with a trigger event. Alternatively, if the sum of the weights of the terms included in the log entry exceeds a predetermined threshold, log-entry-processing module 614 can label the log entry as being associated with a trigger event. Label-output module 616 can output the predicted label of the log entry. In some embodiments, label-output module 616 can output the label to a prognosis module responsible for predicting the RUL of the asset, thereby allowing the prognosis module to reset or recalibrate its RUL-prediction algorithms to account for the change to the operational signature resulting from the maintenance action.

Figure 7:
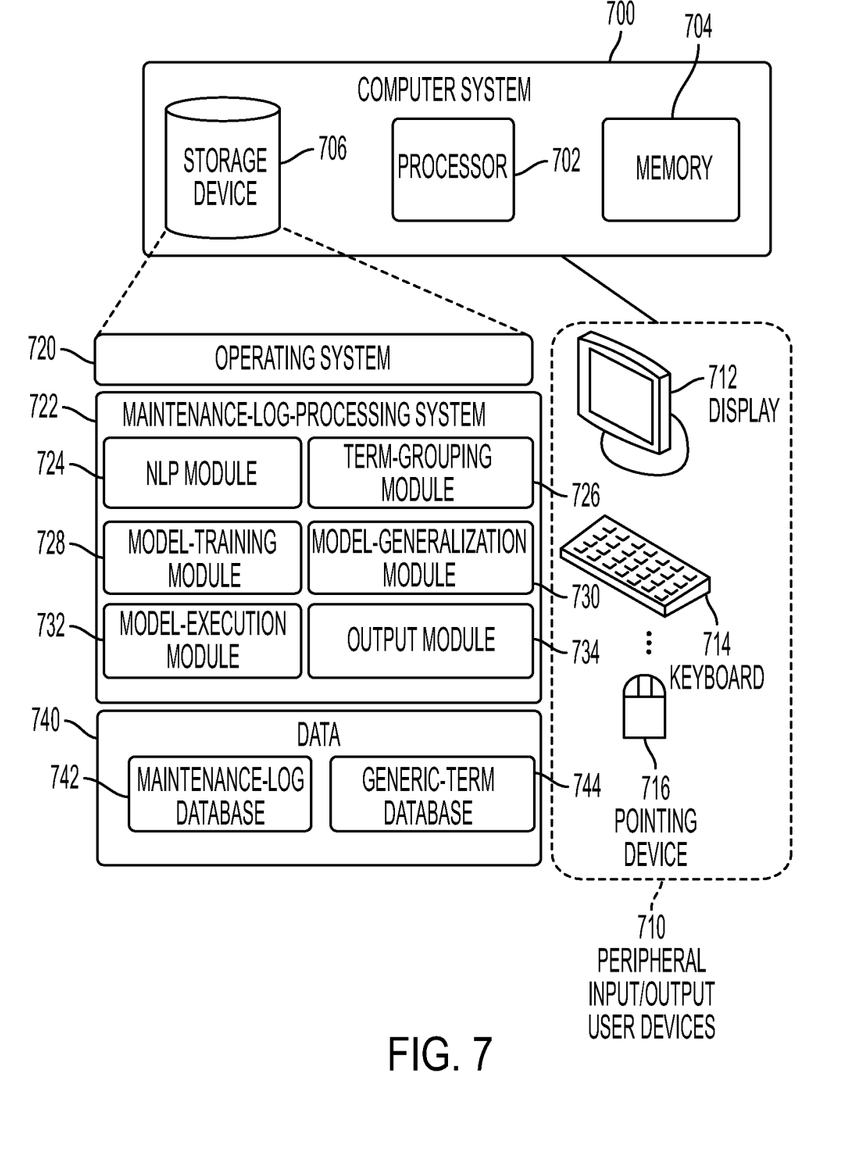
FIG. 7 illustrates an exemplary computer system that facilitates processing of maintenance logs, according to one embodiment.

FIG. 7 illustrates an exemplary computer system that facilitates processing of maintenance logs, according to one embodiment. Computer system 700 includes a processor 702, a memory 704, and a storage device 706. Furthermore, computer system 700 can be coupled to peripheral input/output (I/O) user devices 710, e.g., a display device 712, a keyboard 714, and a pointing device 716. Storage device 706 can store an operating system 720, a maintenance-log-processing system 722, and data 740.

Maintenance-log-processing system 722 can include instructions, which when executed by computer system 700, can cause computer system 700 or processor 702 to perform methods and/or processes described in this disclosure. Specifically, maintenance-log-processing system 722 can include instructions for pre-processing maintenance-log entries using NLP techniques (NLP module 724), instructions for grouping the terms in maintenance-log entries into a generic group and a domain-specific group (term-grouping module 726), instructions for training a machine learning model (model-training module 728), instructions for generalizing the trained machine learning model from one domain to another (model-generalization module 730), instructions for executing the machine learning model to process, during operations of an asset, new maintenance-log entries of the asset (model-execution module 732), and instructions for outputting predicted labels of the new log entries (output module 734). Data 740 can include a maintenance-log database 742 and a generic-term database 744.

Additional Applications

In addition to maintenance logs, the proposed language-processing technique of grouping terms into generic and domain-specific groups and then generalizing learned weights of the generic terms from one domain to the other can also find applications in other areas. More specifically, this technique can be used to analyze natural-language entries that do not conform to the assumptions of conventional NLP techniques, such as terse notes with a lot of abbreviations and jargon, and in situations where there is a lot of contexts not given in the text itself. For example, physician's notes or notes in a customer relationship management (CRM) database often contain entries that may not be easily analyzed using conventional NLP techniques and can benefit from the proposed language-processing technique.

In one example, the language-processing technique can be used to analyze notes taken by customer service representatives during a service call to predict whether or not the reported problem can be resolved over the phone, therefore allowing more efficient service calls. In this scenario, the trigger event is that the reported problem requires action (e.g., sending a technician) beyond the phone call. Among all products being serviced by the customer service representatives, certain products may receive many service calls and there are plenty of training data in their domains, whereas calls about a particular product may be less frequent, resulting in a lack of training data in that particular domain. Because notes taken by the customer service representatives are often terse, grammatically incorrect, and contain many abbreviations, conventional NLP techniques are not able to process such notes successfully. However, by distinguishing between generic and domain-specific terms, the novel language-processing system is able to generalize a machine learning model trained in one domain with abundant training data to a different domain with little to no training data. Therefore, the novel language-processing system can accurately predict whether a problem reported by a customer can be solved over the phone, even if the problem is about a particular type of device that rarely receives complaints.

In general, the disclosed embodiments provide a system and method for processing natural-language entries that may be terse, grammatically incorrect, or contain lots of abbreviations and jargon (e.g., maintenance-log entries). To process such entries, the proposed system uses machine learning models. More specifically, the machine learning models can be trained in one domain that contains ample training data (e.g., annotated maintenance-log entries) and be generalized to a different domain that lacks training data. To train the model, the system can group natural language terms in the training samples of one domain into a generic group and a domain-specific group and learn the weights of generic terms and domain-specific terms separately. When generalizing the trained model from one domain (referred to as the training domain) to the other domain (referred to as the extended domain), the system can first generate initial weight values of the terms found in the extended domain based on the weight values of the corresponding terms found in the training domain. The initial values of the generic terms found in the extended domain can have the same weight values or polarities as those found in the training domain. If a domain-specific term found in the extended domain is analogous to a domain-specific term found in the training domain, the system can also determine the initial weight value of the domain-specific term in the extended domain based on the learned weight value of the analogous term in the training domain. If limited training data is available in the extended domain, the system can perform partial training to adjust those initial weight values. The generalized model can then be used to process natural-language entries in the extended domain. In some embodiments, the natural-language entries are maintenance-log entries, and processing the log entries can include predicting whether a log entry is associated with a maintenance action performed on a device that significantly changes the operational signature of the device. In some embodiments, the output of the machine learning model can be sent to a health-management module that manages the health of the asset to allow the health-management module to make accurate predictions regarding the RUL of the asset. In addition to maintenance logs, the same language-processing technique can be used to process other types of natural-language entries, such as physicians' notes and CRM notes.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for processing natural-language entries, the method comprising: obtaining a plurality of historical natural-language entries associated with a first domain; pre-processing the plurality of historical natural-language entries to obtain a set of generic terms and a set of domain-specific terms; training, by a computer, a machine learning model in the first domain using the plurality of historical natural-language entries associated with the first domain, wherein the training comprises learning weight values of one or more generic terms, wherein a weight value of a respective generic term indicates likelihood that the respective generic term is related to a trigger event; generalizing the machine learning model trained in the first domain, thereby allowing the machine learning model to be applied to a second domain; and processing a natural-language entry associated with the second domain using the generalized machine learning model to determine whether the natural-language entry associated with the second domain corresponds to the trigger event.

2. The method of claim 1, wherein generalizing the machine learning model further comprises determining weight values of generic terms included in natural-language entries associated with the second domain based on weight values of corresponding generic terms learned from training the machine learning model in the first domain.

3. The method of claim 2,
wherein training the machine learning model in the first domain further comprises learning weight values of one or more domain-specific terms, and
wherein generalizing the machine learning model comprises determining a weight value of a term specific to the second domain based on a weight value of an analogous term specific to the first domain learned from training the machine learning model in the first domain.

4. The method of claim 2, wherein determining the weight values of generic terms included in natural-language entries associated with the second domain comprises one of:
assigning a weight value to a generic term in the second domain as the learned weight value of a corresponding generic term in the first domain; and assigning a discrete weight value to a generic term in the second domain based on a polarity of the learned weight value of a corresponding generic term in the first domain.

5. The method of claim 2, wherein generalizing the machine learning model further comprises adjusting the weight values of generic terms in the second domain by performing partial training of the machine learning model using a limited number of historical natural-language entries associated with the second domain.

6. The method of claim 1, wherein the machine learning model comprises a linear support vector machine (SVM) model, a naïve Bayesian model, or a neural network.

7. The method of claim 1, wherein the natural-language entries are maintenance-log entries associated with a device, and wherein the method further comprises:
in response to determining that a maintenance-log entry associated with the second domain corresponds to a trigger event that alters an operational signature of the device, recalibrating a prognosis operation that predicts a remaining useful life (RUL) of the device.

8. A computer system for processing natural-language entries, the computer system comprising: a processor; and a storage device coupled to the processor and storing instructions, which when executed by the processor cause the processor to perform a method, the method comprising: obtaining a plurality of historical natural-language entries associated with a first domain; pre-processing the plurality of historical natural-language entries to obtain a set of generic terms and a set of domain-specific terms; training a machine learning model in the first domain using the plurality of historical natural-language entries associated with the first domain, wherein the training comprises learning weight values of one or more generic terms, wherein a weight value of a respective generic term indicates likelihood that the respective generic term is related to a trigger event; generalizing the machine learning model trained in the first domain, thereby allowing the machine learning model to be applied to a second domain; and processing a natural-language entry associated with the second domain using the generalized machine learning model to determine whether the natural-language entry associated with the second domain corresponds to the trigger event.

9. The computer system of claim 8, wherein generalizing the machine learning model further comprises determining weight values of generic terms included in natural-language entries associated with the second domain based on weight values of corresponding generic terms learned from training the machine learning model in the first domain.

10. The computer system of claim 9,
wherein training the machine learning model in the first domain further comprises learning weight values of one or more domain-specific terms, and
wherein generalizing the machine learning model comprises determining a weight value of a term specific to the second domain based on a weight value of an analogous term specific to the first domain learned from training the machine learning model in the first domain.

11. The computer system of claim 9, wherein determining the weight values of generic terms included in natural-language entries associated with the second domain comprises one of:
assigning a weight value to a generic term in the second domain as the learned weight value of a corresponding generic term in the first domain; and assigning a discrete weight value to a generic term in the second domain based on a polarity of the learned weight value of a corresponding generic term in the first domain.

12. The computer system of claim 9, wherein generalizing the machine learning model further comprises adjusting the weight values of generic terms in the second domain by performing partial training of the machine learning model using a limited number of historical natural-language entries associated with the second domain.

13. The computer system of claim 8, wherein the machine learning model comprises a linear support vector machine (SVM) model, a naïve Bayesian model, or a neural network.

14. The computer system of claim 8, wherein the natural-language entries are maintenance-log entries associated with a device, and wherein the method further comprises:
in response to determining that a maintenance-log entry associated with the second domain corresponds to a trigger event that alters an operational signature of the device, recalibrating a prognosis operation that predicts a remaining useful life (RUL) of the device.

15. A non-transitory computer-readable storage medium storing instructions that when executed by a computer cause the computer to perform a method for processing natural-language entries, the method comprising: obtaining a plurality of historical natural-language entries associated with a first domain; pre-processing the plurality of historical natural-language entries to obtain a set of generic terms and a set of domain-specific terms; training a machine learning model in the first domain using the plurality of historical natural-language entries associated with the first domain, wherein the training comprises learning weight values of one or more generic terms, wherein a weight value of a respective generic term indicates likelihood that the respective generic term is related to a trigger event; generalizing the machine learning model trained in the first domain, thereby allowing the machine learning model to be applied to a second domain; and processing a natural-language entry associated with the second domain using the generalized machine learning model to determine whether the natural-language entry associated with the second domain corresponds to the trigger event.

16. The non-transitory computer-readable storage medium of claim 15, wherein generalizing the machine learning model further comprises determining weight values of generic terms included in natural-language entries associated with the second domain based on weight values of corresponding generic terms learned from training the machine learning model in the first domain.

17. The non-transitory computer-readable storage medium of claim 16, wherein training the machine learning model in the first domain further comprises learning weight values of one or more domain-specific terms, and
wherein generalizing the machine learning model comprises determining a weight value of a term specific to the second domain based on a weight value of an analogous term specific to the first domain learned from training the machine learning model in the first domain.

18. The non-transitory computer-readable storage medium of claim 16, wherein determining the weight values of generic terms included in natural-language entries associated with the second domain comprises one of:
assigning a weight value to a generic term in the second domain as the learned weight value of a corresponding generic term in the first domain; and assigning a discrete weight value to a generic term in the second domain based on a polarity of the learned weight value of a corresponding generic term in the first domain.

19. The non-transitory computer-readable storage medium of claim 16, wherein generalizing the machine learning model further comprises adjusting the weight values of generic terms in the second domain by performing partial training of the machine learning model using a limited number of historical natural-language entries associated with the second domain.

20. The non-transitory computer-readable storage medium of claim 15, wherein the machine learning model comprises a linear support vector machine (SVM) model, a naïve Bayesian model, or a neural network.

* * * * *